United States Patent
Liu et al.

(10) Patent No.: US 8,228,013 B2
(45) Date of Patent: Jul. 24, 2012

(54) METHOD AND APPARATUS FOR AUTOMATICALLY IDENTIFYING ELECTRICAL PARAMETERS IN A SENSOR-LESS PMSM

(75) Inventors: Jingbo Liu, Milwaukee, WI (US); Mark M. Harbaugh, Richfield, OH (US); Thomas A Nondahl, Wauwatosa, WI (US); Peter B. Schmidt, Franklin, WI (US); Semyon Royak, Beachwood, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 743 days.

(21) Appl. No.: 12/208,046

(22) Filed: Sep. 10, 2008

(65) Prior Publication Data
US 2010/0060210 A1 Mar. 11, 2010

(51) Int. Cl.
*H02P 1/04* (2006.01)
(52) U.S. Cl. .............. 318/400.33; 318/400.32; 318/721
(58) Field of Classification Search ............. 318/400.02, 318/400.14, 400.33, 721, 727, 400.01, 400.32
See application file for complete search history.

(56) References Cited

U.S. PATENT DOCUMENTS

| | | | | |
|---|---|---|---|---|
| 6,246,193 | B1 * | 6/2001 | Dister | 318/400.33 |
| 6,441,572 | B2 * | 8/2002 | Batzel | 318/400.33 |
| 6,636,012 | B2 | 10/2003 | Royak et al. | |
| 6,661,194 | B2 * | 12/2003 | Zaremba et al. | 318/727 |
| 7,015,664 | B2 * | 3/2006 | Coles et al. | 318/400.01 |
| 7,262,577 | B2 | 8/2007 | Heikkila et al. | |
| 7,560,895 | B2 * | 7/2009 | Arnet | 318/778 |
| 7,638,967 | B2 * | 12/2009 | Aizawa et al. | 318/778 |
| 7,772,790 | B2 * | 8/2010 | Nashiki | 318/400.02 |

OTHER PUBLICATIONS

Nahid-Mobarakeh, Babak, et al., Mechanical Sensorless Control of PMSM with Online Estimation of Stator Resistance, IEEE Transactions on Industry Applications, vol. 40, No. 2, Mar./Apr. 2004, pp. 457-471, IEEE, New York, New York, USA.
Morimoto, Shiego, et al., Mechanical Sensorless Drives of IPMSM with Online Parameter Identification, IEEE Transactions on Industry Applications, vol. 42, No. 5, Sep./Oct. 2006, pp. 1241-1248, , IEEE, New York, New York, USA.
Silva, César, et al., Hybrid Rotor Position Observer for Wide Speed-Range Sensorless PM Motor Drives Including Zero Speed, IEEE Transactions on Industrial Electronics, vol. 53, No. 2, Apr. 2006, pp. 373-378, , IEEE, New York, New York, USA.
Aihara, Takashi, et al., Sensorless Torque Control of Salient-Pole Synchronous Motor at Zero-Speed Operation, IEEE Transactions on Power Electronics, vol. 14, No. 1, Jan. 1999, pp. 202-208, IEEE, New York, New York, USA.
Kim, Hyunbae, et al., Improved Current Regulators for IPM Machine Drives Using On-Line Parameter Estimation, Conf. Rec. IEEE IAS Annual Meeting, 2002, pp. 86-91, Pittsburgh, PA.

(Continued)

*Primary Examiner* — Walter Benson
*Assistant Examiner* — Antony M Paul
(74) *Attorney, Agent, or Firm* — Boyle Fredrickson, S.C.; Alexander R. Kuszewski; John M. Miller

(57) ABSTRACT

A method and apparatus for determining electrical parameters for commissioning a sensor-less permanent magnet synchronous machine uses knowledge of the rotor position to apply balanced pulses along the rotor magnet axis and perpendicular to the rotor magnet axis allowing measurement of q- and d-inductance at multiple current levels without substantial rotor movement.

23 Claims, 6 Drawing Sheets

OTHER PUBLICATIONS

Noguchi, Toshihiko, et al., Initial Rotor Position Estimation Method of Sensorless PM Synchronous PM Synchronous Motor with No Sensitivity to Armature Resistance, IEEE Transactions on Industrial Electronics, vol. 45, No. 1, Feb. 1998, IEEE, New York, New York, USA.

Kim, Hyunbae, et al., Using On-Line Parameter Estimation to Improve Efficiency of IPM Machine Drives, Proc. of the IEEE PESC Conference, Jun. 23-27, 2002, pp. 815-820, Queensland, Australia.

Hu, Jiangang, et al., Eddy Current Effects on Rotor Position Estimation for Sensorless Control of PM Synchronous Machine, Proceedings of IEEE Industry Applications Conference, Oct. 8-12, 2006, pp. 2034-2039, Tampa, Florida, USA.

Jahns, Thomas M., et al., Interior Permanent-Magnet Synchronous Motors for Adjustable-Speed Drives, IEEE Transactions on Industry Applications, vol. IA-22, No. 4, Jul./Aug. 1986, pp. 738-747, IEEE, New York, New York, USA.

* cited by examiner

METHOD AND APPARATUS FOR AUTOMATICALLY IDENTIFYING ELECTRICAL PARAMETERS IN A SENSOR-LESS PMSM

CROSS-REFERENCE TO RELATED APPLICATIONS

—

STATEMENT REGARDING FEDERALLY SPONSORED RESEARCH OR DEVELOPMENT

—

BACKGROUND OF THE INVENTION

The present invention relates to electric motors and, in particular, to permanent magnet synchronous machines (PMSM) and, more particularly, to a method and apparatus for automatically identifying electrical parameters in sensor-less PMSMs.

Permanent magnet synchronous machines are electric motors having a rotor holding a permanent magnet that may turn about an axis within a stator. The stator holds conductive coils that may be energized to create a rotating magnetic field. The rotating magnetic field is coordinated with the rotor position to draw the rotor along synchronously.

Simple PMSMs employ power transistors to switch the electrical currents in the stator coils to create the necessary rotating magnetic field. "Sensor-less" PMSMs eliminate the rotor position sensors and deduce rotor position from its effect on the electrical signals used to drive the stator coils.

Most motor drives for sensor-less PMSMs deduce rotor position using one of two strategies: (1) signal injection methods injecting a high frequency signal into the stator; and (2) model-based methods based on stator terminal voltages and currents.

In signal injection methods, the rotor position/speed is estimated using a high frequency voltage or current carrier signal superimposed on the fundamental excitation of the stator to track the rotor position. The signal injection method does not need machine parameters; however, it has limitations caused by the extra losses due to the injected high frequency carriers. Therefore, the signal injection sensor-less method should only be used in low speed ranges including zero speed.

In model-based methods, the rotor position/speed is estimated from the stator voltages and currents based on the fundamental component of the back electromotive force (EMF) or flux linkage. Consequently, most model-based methods fail at low and zero speeds because back-EMF is speed dependent. Further, most model-based methods need motor parameters such as q- and d-axis self-inductance and flux linkage to operate effectively.

Motor parameters are not only needed for model-based methods but are also important in maintaining: (1) high performance, maximum torque per ampere (MTPA) control in the constant torque region, and (2) high performance, flux weakening control. Saturation effects in the motor parameter of self-inductance (e.g., q-axis self-inductance) are important.

Ideally motor parameters could be collected automatically during initial commissioning. Current methods to collect these parameters, unfortunately, either are not suitable for sensor-less motors, require knowledge of other machine parameters and are thus not comprehensive, or provide for incomplete collection of the necessary parameters, treating self-inductances as constants.

SUMMARY OF THE INVENTION

The present invention provides an effective parameter estimation system for sensor-less permanent magnet synchronous machines operating during initial commissioning without the need to know other machine parameters. The invention allows stator resistance, d-axis and q-axis self-inductance to all be determined at standstill. Importantly, q-axis self-inductance is determined for a range of current values to accurately model saturation effects.

Specifically then, the present invention provides a motor drive system having an electronic computer to provide and monitor electrical signals communicated between the motor drive and stator of a sensor-less PMSM, the latter having a permanent magnet rotor with a magnet direction rotatable within the stator. A commissioning program in the motor drive executes on the electronic computer to deduce rotor orientation through the application of electrical signals to the stator and employs the deduced orientation to apply electrical signals at multiple current levels to the stator along the q-axis to determine q-axis self-inductance as a function of q-axis current. The drive then applies current to the stator to rotate the rotor and measure flux linkage of the sensor-less PMSM. The sensor-less PMSM may then be operated using a control algorithm receiving as inputs the q- and d-axis inductance and flux linkage where the control algorithm selects a value of q-axis self-inductance corresponding to an operating q-axis current.

It is thus an object of the invention to provide a comprehensive and automatic method of determining motor parameters for a sensor-less PMSM.

It is a further object of the invention to provide within this comprehensive identification of motor parameters, a determination of q-axis self-inductance over a range of q-axis currents, the latter providing accurate accounting for changes in self-inductance needed for a high performance control algorithm.

The range of q-axis currents may be selected to provide measurements of q-axis self-inductance before saturation and after saturation of components of the sensor-less PMSM.

It is thus an object of the invention to determine motor parameters that accurately capture saturation effects.

The step of determining the rotor position may be performed with the rotor substantially stationary.

It is thus an object of the invention to permit initial parameter determination requiring knowledge of rotor position to be conducted before movement of the motor.

The measurement of the two-axis self-inductance may be performed with the rotor substantially stationary.

It is another object of the invention to simplify measurement of q-axis inductance at multiple current levels.

The program may further deduce stator resistance for the control algorithm by the application of electrical signals to the stator.

It is thus an object of the invention to minimize the need for user input even of readily obtained motor parameters.

The stator resistance may be deduced by measuring a current flow under a test voltage applied by a pulse width modulator of the motor drive, the pulse width modulator having a bus voltage, wherein the test voltage is the bus voltage reduced by a pulse width modulation factor and a dead time amount.

It is thus an object of the invention to permit precise resistance measurements using motor drive circuitry ordinarily not intended for precise open loop voltage production.

The deduced orientation of the rotor may be employed to rotate the rotor and measure flux linkage.

It is thus an object of the invention to provide for controlled startup of the motor without the risk of abrupt and unpredictable motion and thus in a manner suitable for commissioning motors already connected to other machinery.

In determining the motor parameter of self-inductance, the electrical signals applied to the stator along the q- and d-axis may be balanced in opposite polarities to prevent substantial rotor movement.

It is thus an object of the invention to permit substantial parameter identification before motion of the motor.

The rotor orientation may be deduced by applying a high frequency signal to the stator to create a rotating magnetic field, and monitoring stator current to determine rotor magnet axis, and applying electrical signals along the d-axis to reveal rotor magnet direction.

It is thus an object of the invention to permit accurate rotor position determination before motion of the motor in a sensor-less PMSM.

These particular objects and advantages may apply to only some embodiments falling within the claims and thus do not define the scope of the invention.

DETAILED DESCRIPTION OF THE PREFERRED EMBODIMENT

Figure 1:
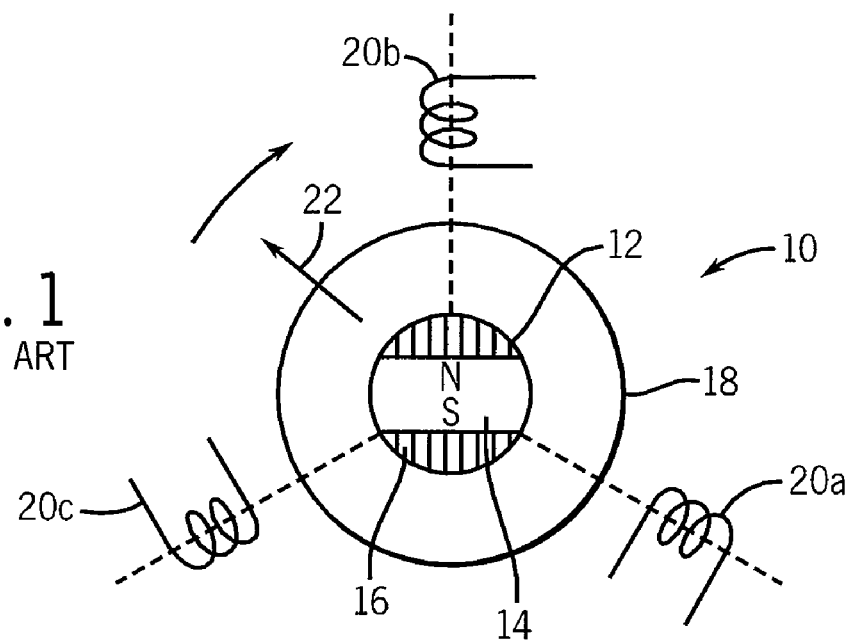
FIG. 1 is a simplified cross-sectional view through a single pole pair permanent magnet synchronous machine of the type suitable for use with the present invention.

Referring now to FIG. 1, a sensor-less PMSM motor 10 provides a rotor 12 attached to a rotatable shaft (not shown) for rotation about an axis through the center of the rotor 12 perpendicular to the plane of the figure. The rotor 12 includes a permanent magnet 14 and ferromagnetic flux directors 16. For clarity, a rotor having a single pole pair (e.g. only a single north and south pole) is shown; however, it will be understood that the present invention is equally applicable to multi-pole rotors.

The rotor 12 may be surrounded by a stator 18 having one or more coils 20a, 20b, and 20c shown here positioned at regular angles of 120° about the rotor 12. Again additional coils may be provided according to techniques well known in the art for motors having larger numbers of poles.

Generally, appropriately phased signals may be applied to each of coils 20a, 20b and 20c to produce a rotating magnetic field vector 22 synchronously attracting the rotor 12 to drive the motor 10.

Figure 2:
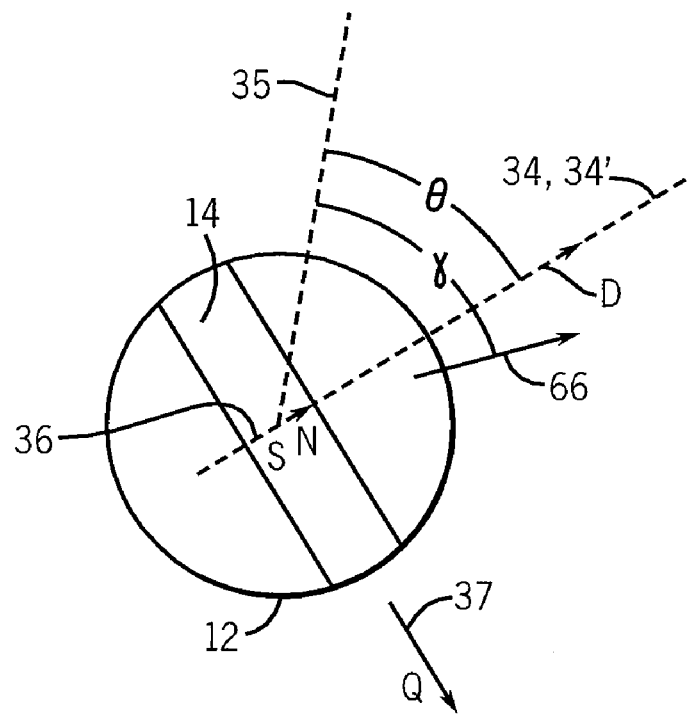
FIG. 2 is an enlarged view of the rotor of FIG. 1 showing various axes and a rotating magnetic field described in the specification.

Referring now to FIG. 2, the permanent magnet 14 of the rotor 12 has a magnetic vector defined by the north pole and one south pole of the permanent magnet 14 and defining both a magnetic axis 34 and a magnet direction 36, (the latter having a direction, from south to north). A d-axis 34' of the rotor 12 is aligned with the magnetic axis 34 and a q-axis 37 of the rotor is perpendicular to the magnetic axis 34. The magnetic axis 34 and magnet direction 36 also define a rotor angular position θ measured between an arbitrary stationary reference point and the d-axis.

Figure 3:
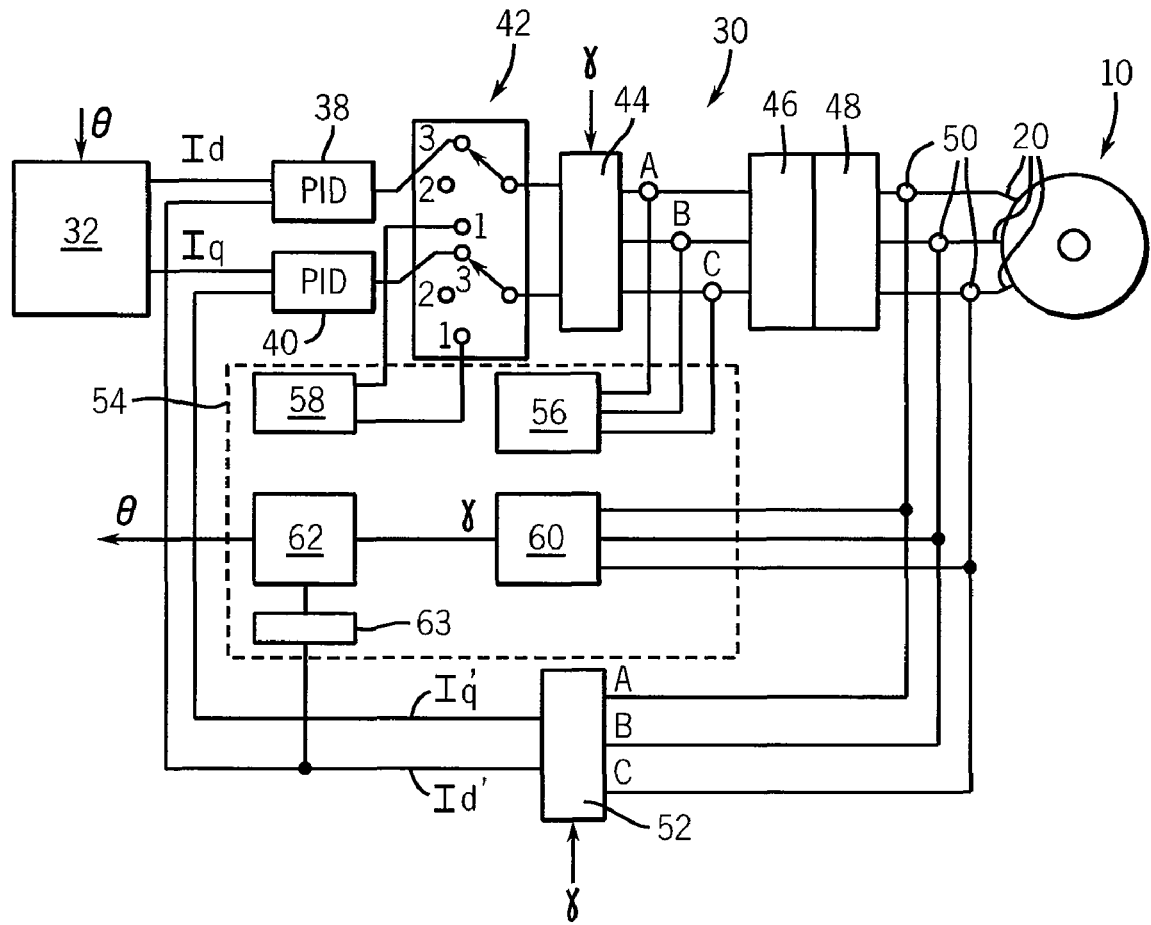
FIG. 3 is a block diagram of an electronic drive for the motor of FIG. 1 such as may incorporate the present invention.

Referring now to FIG. 3, a motor drive 30 suitable for practicing the present invention may receive command signals at motor control logic 32, for example position and velocity or acceleration commands, and may regulate these commands into a q and d current $I_q$ and $I_d$ respectively. As is understood in the art, these currents define stator currents that will produce magnetic fields in the q-axis and d-axis directions respectively. In order to effect acceleration and speed control, the motor control logic 32 must receive an indication of rotor position θ.

The $I_q$ and $I_d$ currents are received by PID controllers (proportional, integral, derivative controllers) or other similar feedback control circuits 40 and 38 respectively, which provide voltage commands to null the error signals for the $I_q$ and $I_d$ currents respectively.

The error signals may be received by one pole (3) of a single pole, triple throw switch pair 42, which, during normal operation, is connected to a vector rotator 44 which, using knowledge of θ (during normal operation), converts the $I_d$ and $I_q$ currents to A, B and C currents corresponding to coils 20a, 20b and 20c described above and more generally to three phases of power provided to the motor 10. The present invention, in which θ is initially unknown, substitutes a generated value of γ to produce the desired test waveforms to be described.

These A, B and C currents are received by a pulse width modulator 46 which provides pulse width modulated signals to an inverter 48 which, in turn, provides high power current to the coils 20 and thus to the motor 10 producing the A, B and C currents.

The current on coils 20 is monitored by current sensors 50 and provided to a vector de-rotator 52 performing the opposite function of vector rotator 44 in converting signals A, B and C into feedback currents $I'_d$ and $I'_q$. These feedback currents $I'_d$ and $I'_q$ are in turn provided to the feedback control circuits 38 and 40 to complete a feedback control loop as is understood in the art.

The present invention augments this motor drive 30 through the addition of five blocks that form a position detection system 54. The first block is a high-frequency injector 56 which may add a signal on top of (or instead of) the drive power provided to the motor 10 producing a high-frequency, low-power rotating magnetic field as will be described. In one embodiment, as shown, the signal from the high-frequency injector 56 is added to the A, B and C voltages after the vector rotator 44.

The second block of the position detection system 54 is a pulse injector 58 which is connected to one pole (1) of switch pair 42 to be connected to the input of vector rotator 44 during resistance and inductance measurement stages of parameter estimation before the rotor 12 is rotating. Generally, the pulse injector 58 is used to apply voltages to the stator coils 20 for the measurement of resistance and self-inductance and for a determination of magnet direction of the rotor 12.

A third block of the position detection system 54 is a current monitor 60 receiving the signals taken at current sensors 50. The current monitor is used in the measurements of stator resistance, self-inductance and flux linkage. The current monitor 60 is also used during application of the high-frequency rotating field to the stator coils 20 from high-frequency injector 56 to determine a magnetic axis signal γ indicating the orientation of the magnetic axis 34 (without direction) as deduced from measurements of the power signals. Generally γ could either equal θ or θ+180 degrees as a result of the fundamental symmetry in saliency of the rotor 12.

A fourth block of the position detection system 54 is a magnetic direction analyzer 63 monitoring the feedback current $I_d$ during application of pulses from the pulse injector 58 to determine magnet direction 36.

Finally, the fifth block is a rotor position extractor 62 using the magnetic axis signal γ and the magnet direction 36 to deduce θ as will be described.

Generally the elements of the motor drive 30 will include discrete electrical components, including power semiconductors and the like as well as one or more computer processors executing stored programs to implement functional blocks described.

Figure 4:
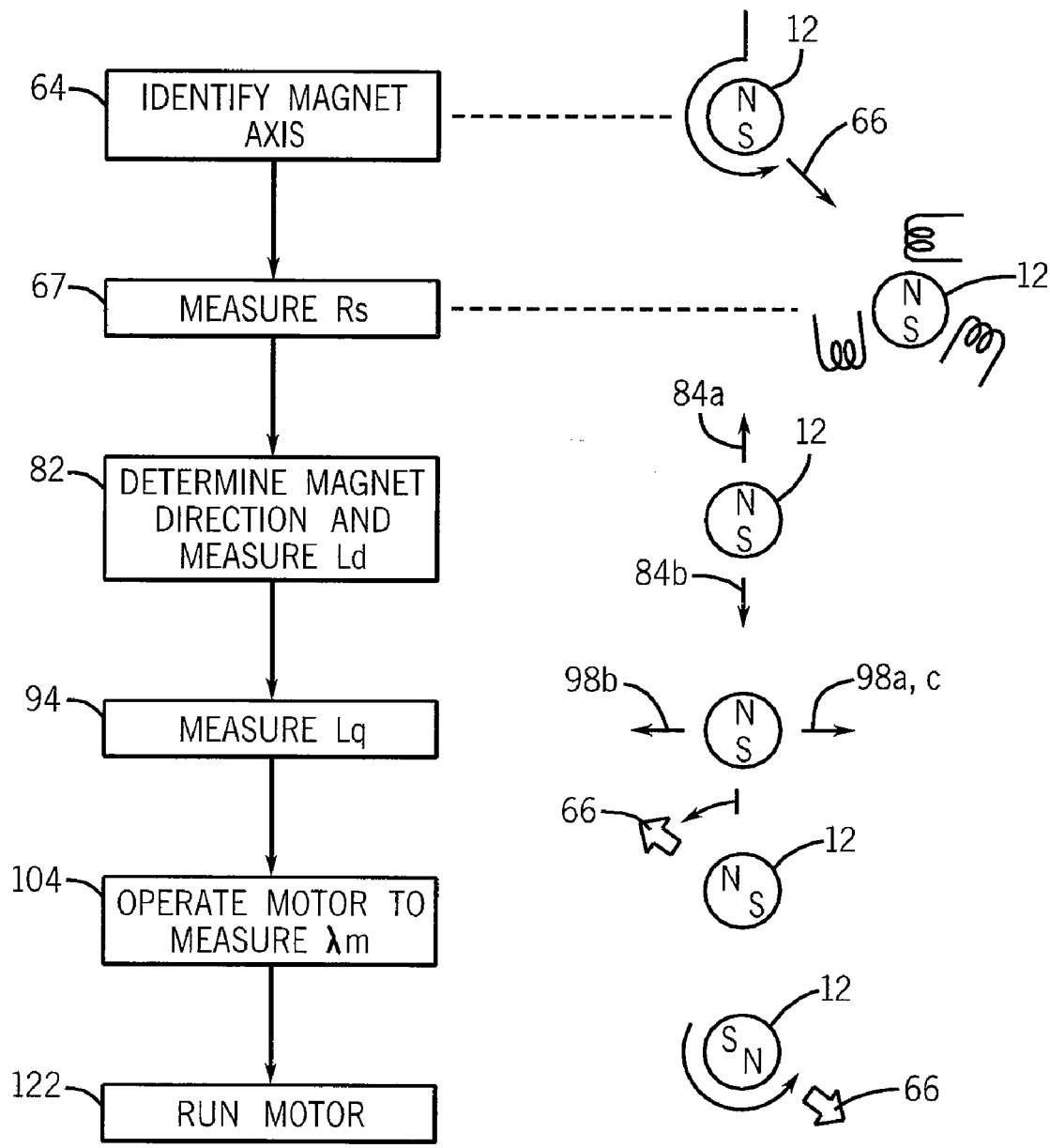
FIG. 4 is a flow chart showing the steps implemented by a program in the electronic drive of FIG. 3 adjacent to simplified representations of the fields applied to the rotor.

Referring now to FIGS. 3 and 4, the position detection system 54 may operate according to a stored program having initial process block 64. During this process block 64, a high-speed rotational vector from injector 56 is applied to the pulse width modulator 46 and inverter 48 to generate a rotating magnetic field about the rotor 12. At this time, the rotor 12 is stationary and switch pair 42 is connected to pole (2) disconnecting the feedback control circuits 38 and 40.

Referring momentarily to FIG. 2, this high-speed rotational vector 66 has a low-strength and high angular speed such as to not induce rotation in the rotor 12. As a practical matter, the rotor 12 experiences a slight torque from the projection of the rotational vector 66 on the q-axis, but the direction of torque changes rapidly so that the rotational inertia of the rotor 12 prevents substantial motion. Generally the speed of rotation of the vector 66 will be substantially greater than the normal rotational speed of the motor but at a frequency low enough to prevent substantial inductive attenuation.

The currents at the coils 20 are monitored by the current monitor 60 to determine the angle of the rotor magnetic axis 34. Generally, this is done by monitoring the saliency features in the current waveform from the stator which exhibits two peaks when the rotating vector is aligned with the magnet axis 34 in either of two directions over a full motor phase cycle of the vector 66. A motor phase cycle will be 360° for a single pole pair motor, or 360/N° for an N-pole pair motor where generally N is the number of duplications of coils 20a-20c around the stator. Because there are generally two saliency features for every motor phase cycle, this determination of process block 64 identifies only the magnetic axis 34 (γ) and not the magnet direction 36 (θ). This technique is described in co-pending U.S. application Ser. No. 12/183,758 entitled: "Method And Apparatus For Identifying Orientation Of A Stationary Rotor In A Sensor-Less PMSM", filed Jul. 31, 2008, assigned to the assignee of the present invention and hereby incorporated by reference, which has issued as U.S. Pat. No. 7,944,164. Alternatively, the rotor orientation may be deduced by measuring the stator current response to select voltage pulses as described in U.S. Pat. No. 6,172,498.

Figure 5:
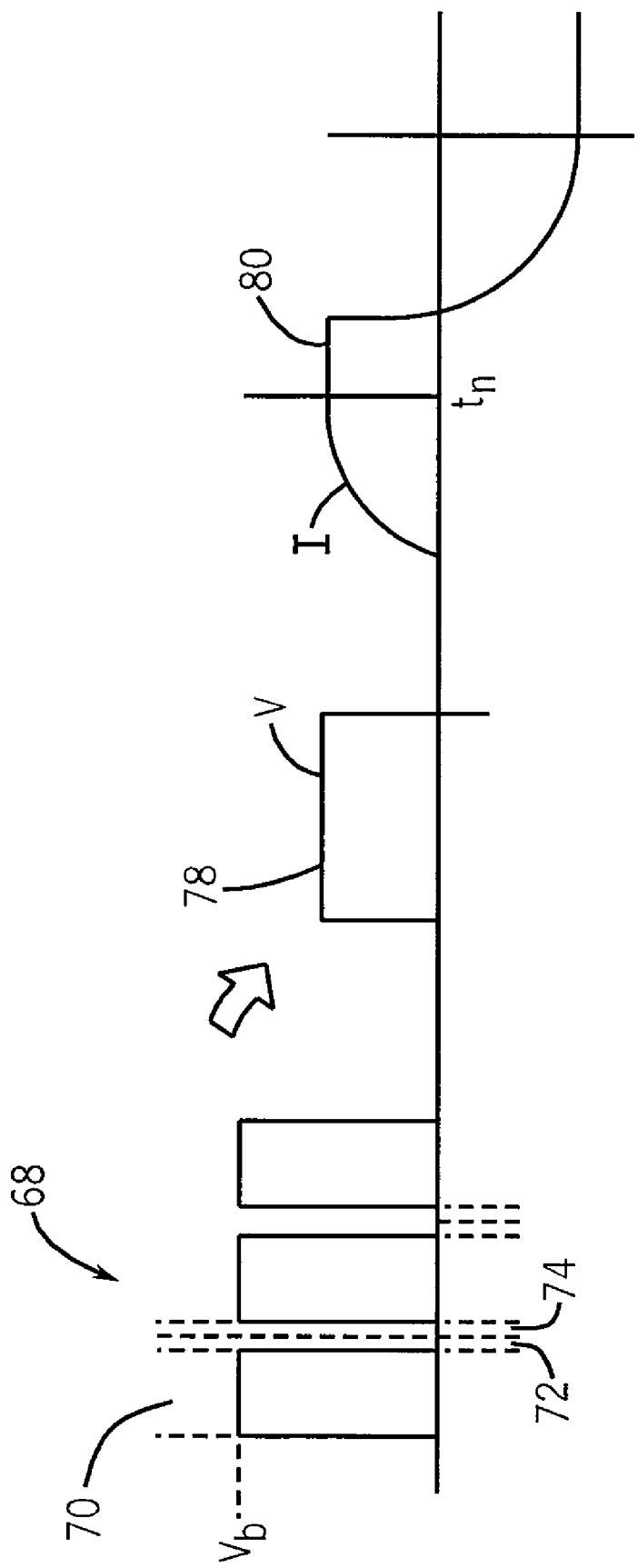
FIG. 5 is a plot of the pulse width modulated output of the electronic drive of FIG. 3 showing extraction of an effective DC voltage and a steady-state current measurement to deduce rotor resistance.

Referring now to FIGS. 4 and 5, at process block 67, the stator resistance is determined by applying a known test voltage 78 to the stator coils 20a-20c and measuring the current using the current monitor 60. The test voltage 78 is limited in amplitude and applied along the magnetic axis 34 to minimize rotation of the rotor 12. Generally, in order to apply the test voltage 78 along the magnetic axis 34, different voltages must be applied to each of the stator coils 20a-20c such that the vector sum of the produced fields aligns with the magnetic axis 34.

Because the output of the motor drive 30 (provided by pulse width modulator 46 and inverter 48) provides for a duty cycle or pulse width modulated waveform 68, DC steady-state voltages cannot be obtained at the output of the motor drive 30, however average voltage values and average current values may be used to accommodate this shortcoming. The average applied test voltage 78 may be computed by considering the nominal on-time 70 and off-time 72 of the output waveform from the inverter (controllable in open loop control by the motor drive 30 operating according to the current program), the bus voltage $V_b$ of the motor drive (measured by a connected analog-to-digital converter) and the dead time 74 in the waveform 68, representing a predetermined delay in the switching of the output transistors intended to prevent opposing transistors from being simultaneously switched on and shorting the bus. These known quantities can be used provide an effective average test voltage 78 applied to the stator 18 being, for example, the bus voltage times the on-time 70 divided by the sum of the on-time 70, off-time 72 and dead time 74.

During the application of the applied test voltage 78, the current monitor 60 monitors the current 80 at a time $t_n$ after the application of the test voltage 78 when the current 80 has reached a steady-state. The test voltage 78 divided by the steady-state current at time $t_n$ provides stator resistance. This process may be repeated with opposite polarity test voltage 78 and the two values averaged.

Figure 6:
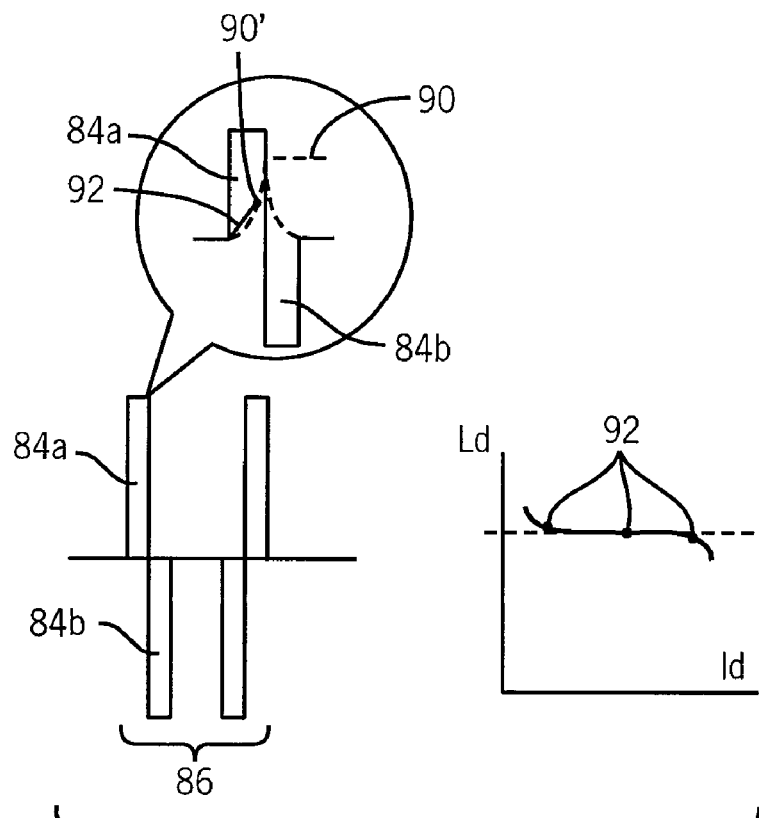
FIG. 6 is two graphs, the leftmost graph showing pulses applied along the d-axis to deduce rotor position and d-axis self-inductance and the rightmost graph showing derived d-axis self-inductance.

Referring now to FIGS. 4 and 6, at succeeding process block 82, first and second polarity, equal amplitude pulses 84a and 84b may be applied along the magnetic axis 34. These pulses may be produced by pulse injector 58 as shown in FIG. 3 when switch pair 42 is switched to poles (1). The pulses are applied in sets 86 of four pulses with a first positive polarity pulse 84a followed by a second negative polarity pulse 84b and then, after a short delay, with a third negative polarity pulse 84b followed by a fourth positive polarity pulse 84a. By pairing pulses 84a and 84b together, net torque on the rotor 12 is reduced with the second pulse in each pair serving as a current suppression pulse.

Each of these pulse sets 86 is then repeated if needed. During the application of the pulses 84, the current monitor 60 determines a current peak 90 (positive and negative) to deduce two pieces of information. First, by comparing the peak 90 associated with the first and second pulse pairs of pulses 84 of each set 86, the magnet direction 36 may be determined. Generally the current flow in different directions, and hence the peaks 90, will differ based on saturation of the ferromagnetic components of the stator 18. This difference in current reveals the magnet direction 36 of the rotor 12 along the magnetic axis 34. Again, this process is described in greater detail in the above referenced co-pending US application. By making this comparison, actual magnet direction 36 (θ) is known and can be used for starting the motor 10.

The second piece of information revealed by the current peaks 90 is the d-axis self-inductance. Generally the self-inductance may be measured by a straight line approximation extending from the initiation of the first pulse of each pair of pulses 84 associated with a peak 90, to point 90' before the peak 90, the slope of this line providing a data point 92 in a plot of d-axis self-inductance ($L_d$) for the current at point 90'. Multiple data points 92 for different amplitudes of point 90' provide d-axis self-inductance ($L_d$) as a function of current.

Figure 7:
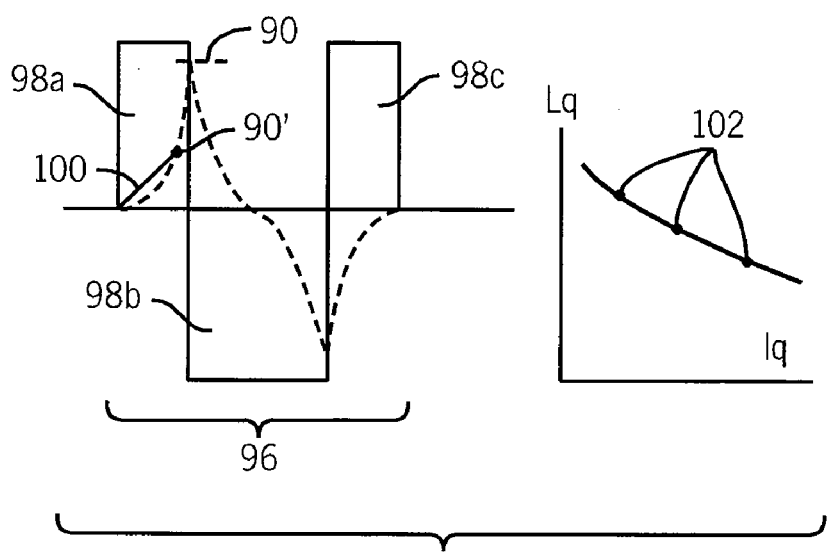
FIG. 7 is a figure similar to that of FIG. 6, the leftmost graph showing pulses applied to the q-axis to deduce q-axis self-inductance, and the rightmost graph showing q-axis self-inductance as a function of current.

Referring now to FIGS. 4 and 7, at succeeding process block 94, a similar process is employed with respect to measurement of q-axis self-inductance. In this case, a pulse set 96 may be applied to the stator coils 20 perpendicular to the magnetic axis 34 consisting of a positive polarity pulse 98a followed by a negative polarity pulse 98b having twice the area of pulse 98a, in turn followed by a second positive 98c having the same polarity and area as pulse 98a. Again, the inductance may be determined by a straight line approximation 100 between the start of pulse 98a and a current point 90' of the current waveform 93 measured by the current monitor 60.

As before, additional current points 90' are then used to provide multiple data points 102 representing q-axis self-inductance ($L_q$) at different stator currents. In this case, there is a strong functional relationship between q-axis self-inductance ($L_q$) and current, and thus multiple data points 102 are stored in a lookup table as will be described.

Referring again to FIG. 4, at next process block 104 the motor 10 may be operated to rotate the rotor 12 using a rotating field 66 of a frequency that may capture the rotor 12. Just before the motor 10 has started, the high-frequency signal of process block 64 is reapplied to the stator coils 20 and used to monitor rotor magnetic axis 34 in the manner described with respect to process block 64 for ongoing sensor-less operation.

As the motor 10 is rotated at a known frequency, flux linkage ($\lambda_m$) may be measured according to the following equation:

$$\lambda_m = \frac{v_q - R_s \cdot i_q}{\omega} - L_d \cdot i_d$$

where ω is the speed of rotation of the rotor, $L_d$ is the d-axis self-inductance (previously determined), $R_s$ is the stator resistance (previously determined) and $v_q$ and $i_d$ are average q-axis voltage (determined as described above) and average d-axis current monitored by the current monitor 60 during this rotational period.

Figure 8:
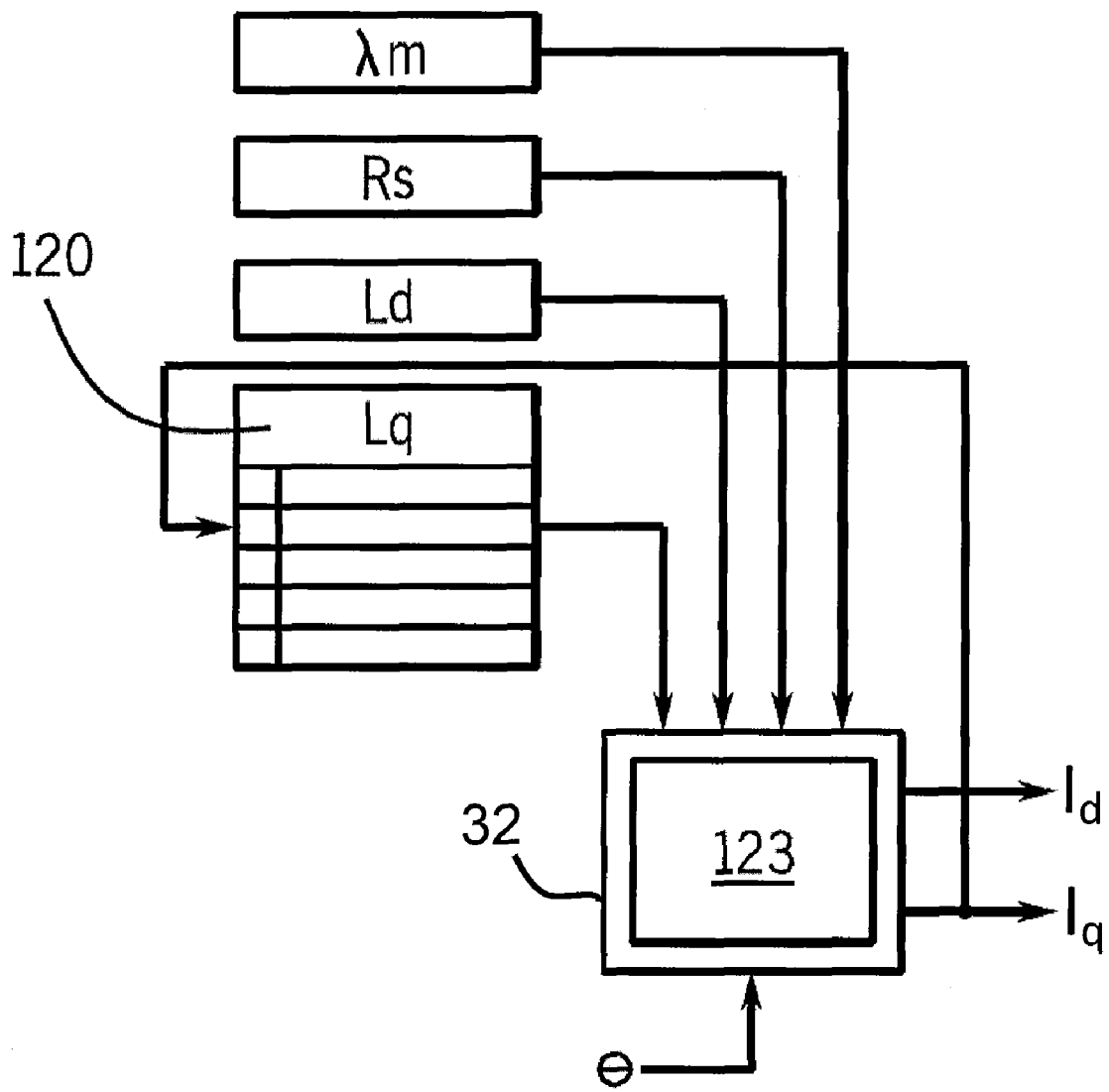
FIG. 8 is a block diagram of the control algorithm used by the present invention exploiting the derived parameters.

Referring now to FIGS. 4 and 8, at process block 122 the measured parameters including multiple values of q-axis inductance held in a lookup table 120, may be provided to a standard motor control algorithm 123 implemented by motor control logic 32 to provide q- and d-axis current commands to the feedback control circuits 38 and 40. During normal operation of the motor, measured q-axis currents are periodically applied to the lookup table 120 to obtain accurate q-axis self-inductance ($L_q$) dynamically reflecting actual operating conditions of the motor.

The present invention has been described in terms of the preferred embodiment, and it is recognized that equivalents, alternatives, and modifications, aside from those expressly stated, are possible and within the scope of the appending claims.

We claim:

1. A motor drive system comprising:
   a motor control logic circuit providing and monitoring electrical signals communicated between a motor drive and a stator of a sensor-less PMSM, the sensor-less PMSM having a permanent magnet rotor having a magnetic direction and rotatable within the stator;
   a voltage pulse injector configured to execute in the motor control logic circuit to provide a plurality of voltage pulses;
   a current controller configured to execute in the motor control logic circuit to provide a plurality of voltage commands;
   a pulse width modulator providing the electrical signals to the stator as a function of at least one of the voltage pulses and the voltage commands;
   a selection module having at least two states and operative to selectively provide the voltage pulses to the pulse width modulator in a first state and the voltage commands in a second state;
   a commissioning program executing in the motor control logic circuit with the selection module in the first state to:
   (a) deduce rotor orientation by the application of the voltage pulses to the stator; and
   (b) employ the deduced orientation to apply at least one electrical signal to the stator along a q-axis of the rotor to measure q-axis self-inductance as a function of q-axis current and applying at least one electrical signal to the stator along a d-axis of the rotor to measure d-axis self-inductance; and
   a control algorithm executing in the motor control logic circuit with the selection module in the second state to operate the sensor-less PMSM as a function of the measured q-axis and d-axis self inductance.

2. The motor drive system of claim 1 wherein the step (a) is performed with the rotor substantially stationary.

3. The motor drive system of claim 1 wherein the step (b) is performed with the rotor substantially stationary.

4. The motor drive system of claim 1 wherein the commissioning program deduces stator resistance by the application of electrical signals to the stator; and
   wherein the control algorithm also receives the stator resistance to operate the sensor-less PMSM.

5. The motor drive system of claim 4 wherein the stator resistance is deduced by a current flow under a test voltage applied by a pulse width modulator having a bus voltage, wherein the test voltage is the bus voltage reduced by a pulse width modulation factor and a dead time amount.

6. The motor drive system of claim 4 wherein the deduced orientation of step (a) is employed to rotate the rotor and measure flux linkage.

7. The motor drive system of claim 1 wherein in step (b) the electrical signals applied to the stator along the q- and d-axis are balanced in opposite polarities to prevent substantial rotor movement.

8. The motor drive system of claim 1 wherein rotor orientation is deduced at step (a) by applying a high frequency signal to the stator to create a rotating magnetic field and monitoring stator current to determine rotor magnet axis and applying electrical signals along the d-axis to reveal rotor magnet direction.

9. The motor drive system of claim 1 further including the step of:

(c) applying current to the stator to rotate the rotor and measure flux linkage of the sensor-less PMSM.

10. A method of commissioning a sensor-less PMSM with a motor drive system, the sensor-less PSM having a permanent magnet rotor having a magnetic direction and rotatable within stator coils and the motor drive system having a selection module operative to selectively provide a plurality of voltage pulses generated by a voltage pulse injector to the stator coils in a first state and to selectively provide a plurality of voltage commands generated by a current controller to the stator coils in a second state, the automatic commissioning method comprising the steps of:
(a) placing the selection module in the first state;
(b) deducing rotor orientation by the application of electrical signals to the stator;
(c) employing the deduced orientation to apply at least one electrical signal to the stator along a q-axis of the rotor to measure q-axis self-inductance as a function of q-axis current and applying at least one electrical signal to the stator along a d-axis of the rotor to measure d-axis self-inductance;
(d) placing the selection module in the second state; and
(e) operating the sensor-less PMSM using a control algorithm executing in the motor control logic to provide electrical signals to the stator as a function of the measured q-axis and d-axis self inductance.

11. The method of claim 10 wherein the electrical signals applied to the q-axis include multiple current levels to provide a q-axis inductance as a function of q-axis current throughout a range including saturation of components of the sensor-less PMSM and wherein the control algorithm selects q-axis inductance corresponding to an operating q-axis current.

12. The method of claim 10 wherein the step (b) is performed with the rotor substantially stationary.

13. The method of claim 10 wherein the step (c) is performed with the rotor substantially stationary.

14. The method of claim 10 wherein the automatic commissioning program further deduces stator resistance by the application of electrical signals to the stator; and
wherein the stator resistance is also input to the control algorithm to operate the sensor-less PMSM.

15. The method of claim 14 wherein the stator resistance is deduced by a current flow under a test voltage applied by a pulse width modulator having a bus voltage, wherein the test voltage is the bus voltage reduced by a pulse width modulation factor and a dead time amount.

16. The method of claim 10 wherein in step (c) the electrical signals applied to the stator along the q- and d-axis are balanced in opposite polarity to prevent substantial rotor movement.

17. The method of claim 10 wherein rotor orientation is deduced at step (b) by applying a high frequency signal to the stator to create a rotating magnetic field and monitoring stator current to determine rotor magnet axis and applying electrical signals along the d-axis to reveal rotor magnet direction.

18. The method of claim 10 further including, between steps (c) and (d), the following step of:
applying current to the stator to rotate the rotor and measure flux linkage of the sensor-less PMSM.

19. In a motor drive system having a selection module operative to selectively provide a plurality of voltage pulses generated by a voltage pulse injector to the stator coils in a first state and to selectively provide a plurality of voltage commands generated by a current controller to the stator coils in a second state and also having a motor control logic circuit providing and monitoring electrical signals communicated between a motor drive and a stator of a sensor-less PMSM, the sensor-less PMSM having a permanent magnet rotor having a magnetic direction and rotatable within the stator, a commissioning program executing in the motor control logic circuit with the selection module in the first state to:
(a) deduce rotor orientation by the application of electrical signals to the stator; and
(b) employ the deduced orientation to apply at least one electrical signal to the stator along a q-axis of the rotor to measure q-axis self-inductance as a function of q-axis current and applying at least one electrical signal to the stator along a d-axis of the rotor to measure d-axis self-inductance; and
a control algorithm executing in the motor control logic circuit with the selection module in the first state to operate the sensor-less PMSM as a function of the measured q-axis and d-axis self inductance.

20. The commissioning program of claim 19 wherein the step (a) is performed with the rotor substantially stationary.

21. The commissioning program of claim 19 wherein the step (b) is performed with the rotor substantially stationary.

22. The commissioning program of claim 19 wherein the program further deduces stator resistance by the application of electrical signals to the stator; and
wherein the control algorithm also receives the stator resistance to operate the sensor-less PMSM.

23. The commissioning program of claim 19 wherein the program:
(c) applies current to the stator to rotate the rotor and measure flux linkage of the sensor-less PMSM.

* * * * *